Dec. 15, 1936.   E. J. CRANE   2,064,295
POWER TRANSMISSION MECHANISM
Filed Dec. 10, 1930
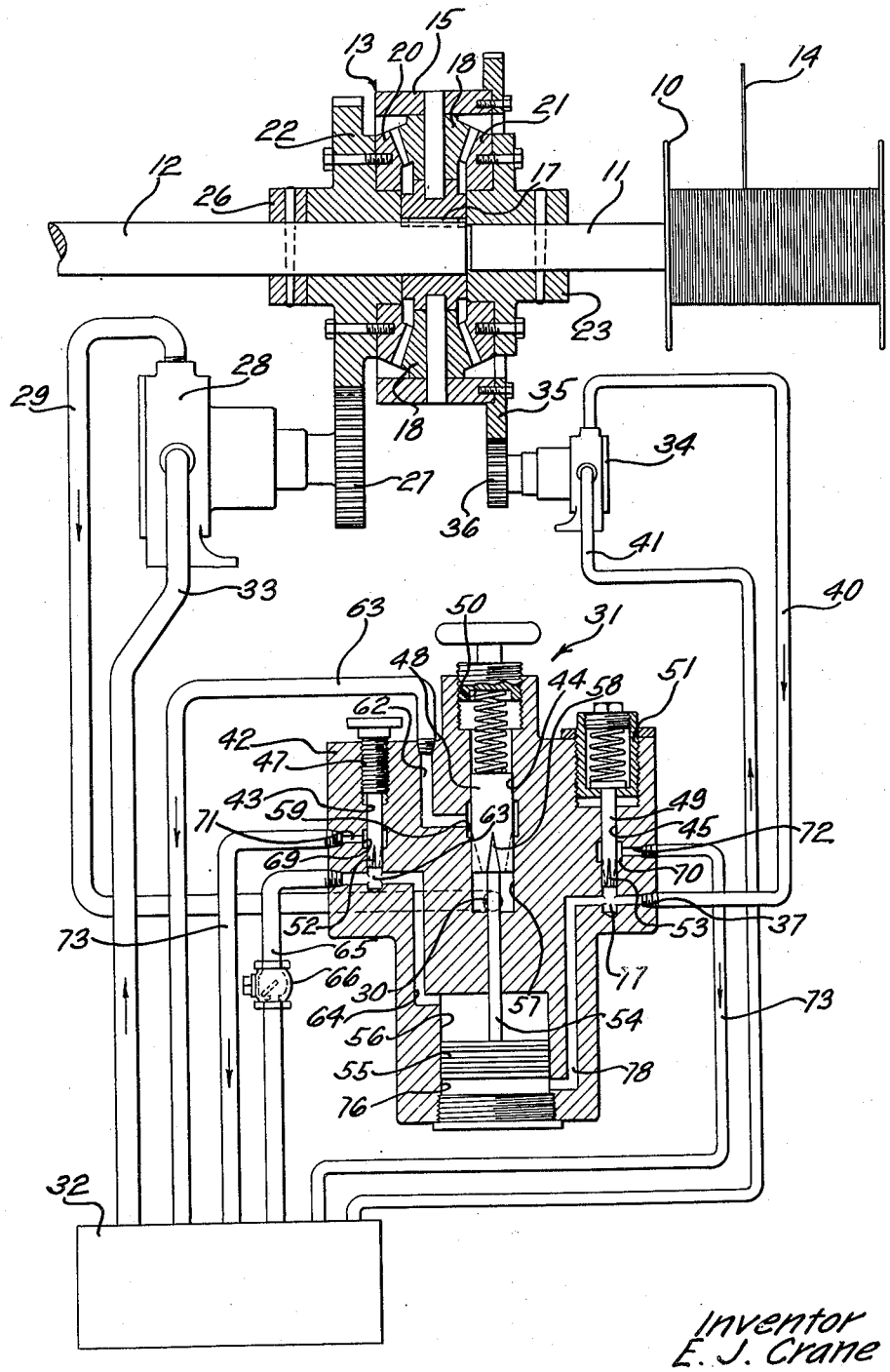
Inventor
E. J. Crane
By H. B. Whitfield Atty.

Patented Dec. 15, 1936

2,064,295

UNITED STATES PATENT OFFICE 2,064,295

POWER TRANSMISSION MECHANISM

Edward J. Crane, Berwyn, Ill., assignor to Western Electric Company, Incorporated, New York, York, N. Y., a corporation of New York Application December 10, 1930, Serial No. 501,219

7 Claims. (Cl. 74—293)

This invention relates to power transmission mechanisms, and more particularly to a variable speed power transmission mechanism for driving material reeling apparatus.

The primary object of this invention is to provide an improved variable speed power transmission mechanism for controlling the power transmitted from a constant speed driving member to a driven member in accordance with changes in operating conditions of the driven member for maintaining a desired operating condition thereof.

In accordance with one embodiment of this invention as applied to a material reeling apparatus there is provided a mechanism for insuring a desired variable speed to a take-up reel in accordance with the constantly increasing diameter of the body of material being wound thereon, for maintaining a uniform tension on the material, providing automatically an increased starting torque, and compensating for torque variations when the speed of the apparatus is changed. Specifically, the mechanism includes a main driving shaft connected to one side of a differential gear train for driving the take-up reel and a fluid system including a main pump, driven from the opposite side of the gear train, acting as a brake thereon. The pump, the speed of which is responsive to variations in the operating conditions or speed of the reel, delivers pressure fluid to an adjustable main control valve variable in response to the pressure of the fluid delivered by the pump to control the braking torque exerted by the pump, and thereby the driving torque exerted on the reel.

Other objects and advantages of this invention will more fully appear from the following detailed description taken in connection with the accompanying drawing, wherein the single figure is a diagrammatic view, partly in section, of a power transmission mechanism embodying the features of this invention applied to the reeling of strand material.

Referring now to the drawing in detail there is illustrated a strand, cable or wire take-up reel 10 detachably fixed to a shaft 11 driven from a main driving shaft 12 through a differential gear train 13 operatively connected to the adjacent ends of the shafts 11 and 12, the shaft 12 being driven at a predetermined constant speed from a suitable power source (not shown) in accordance with the particular characteristics of the strand, cable or wire 14 to be reeled. The gear train 13 comprises a spider 15 keyed as indicated at 17 to rotate at a constant speed with the driving shaft 12. Rotatably carried on the spider 15 at diametrically opposite points are bevel pinions 18 which are constantly in mesh with bevel gears 20 and 21. The bevel gear 20, which functions as a braking gear in a manner to be described hereinafter, is fixed to the inner end face of a gear 22 journaled upon the driving shaft 12, while the bevel gear 21 is fixed to the end face of a sleeve 23 pinned to rotate with the driven shaft 11. A collar 26 pinned to the shaft 12 in abutting relation with the outer end face of the gear 22 holds the bevel gear 20 in mesh with the bevel pinions 18. The gear 22 meshes with a gear 27 fixed to the shaft of a positive delivery pressure fluid pump 28, the outlet port of which is connected by a pipe 29 to an inlet port 30 of a multiple control valve 31, the inlet port of the pump being connected to a suitable fluid supply or reservoir 32 by a pipe 33. A second positive delivery pressure fluid pump 34 is driven directly from the spider 15 by means of gears 35 and 36 connected to the spider and the shaft of the pump, respectively, and therefore is driven at a speed proportional to that of the driving shaft 12. The outlet and inlet ports of the pump 34 are connected to an inlet port 37 of the control valve 31 and the fluid reservoir 32 by pipes 40 and 41, respectively.

The multiple control valve 31 comprises a casing 42 provided with longitudinally extending shouldered bores 43, 44, and 45, the bore 43 having threaded thereinto an adjustable valve member 47, while the bores 44 and 45 have slidably mounted therein spring pressed valve plungers 48 and 49, respectively. The compression of the spring bearing upon the upper end of the plunger 48 may be regulated by means of an adjustable seat 50 at the upper end of the spring, the compression of the spring being varied in accordance with the tension desired to be maintained on the wire 14 during the reeling operation. The plunger 49 at its upper end is formed with an enlargement which normally rests against the inner surface of the bottom wall of an adjustable cup 51 threaded into the valve casing 42, the cup being held in its adjusted position by a lock nut threaded thereonto and abutting the upper surface of the valve casing. A spring mounted in the cup 51 and bearing at opposite ends against the enlargement of the plunger 49 and a plug threaded into the upper end of the cup holds the enlargement in its normal position. At their lower ends the valve member 47 and the plunger 49 are formed peripherally with a plurality of equally spaced tapered V-shaped fluid throttling passages or slots 52 and 53, respectively. It will be apparent that by adjusting the valve member 47 and the valve plunger 49, the latter being movable by rotating the cup 51, the fluid throttling slots 52 and 53, respectively, may be adjusted relative to discharge passages to be presently referred to for varying the volume of fluid throttled therethrough. Connected to the lower end of the plunger 48 by a reduced stem portion 54 thereof is a piston 55 operable in a chamber 56, the piston and the chamber serving as a dash pot. A chamber 57 below the plunger 48 is in communication with the inlet port 30 of the valve casing 42. Also formed peripherally in the plunger 48 beginning at its lower end are a plurality of equally spaced V-shaped fluid throttling passages or slots 58 through which the pressure fluid is throttled from the chamber 57 to an annular chamber 59 surrounding the plunger 48, the chamber 59 being connected to the fluid reservoir 32 by a passage 62 and a pipe 63 while the chamber 57 is connected to the outlet port of the pump 28 by the port 30 and the pipe 29 hereinbefore referred to.

The dash pot chamber 56 is connected to a chamber 63 located below the valve member 47 by a passage 64, which passage also extends from the chamber 63 and is connected by a pipe 65 to the fluid reservoir 32, the pipe having inserted therein a check valve 66. Surrounding the valve member 47 and the plunger 49 are annular chambers 69 and 70, respectively, which are normally in communication with the upper ends of the V-shaped fluid throttling slots 52 and 53 of the valve member and plunger, respectively. Outlet ports 71 and 72 of the chambers 69 and 70, respectively, are connected to the fluid reservoir by pipes 73. A chamber 76 below the piston 55 is connected to a chamber 77 located below the plunger 49 by a passage 78, which passage also extends from the chamber 77 into communication with the inlet port 37, which as hereinbefore described is connected to the outlet port of the pump 34 by the pipe 40.

The hereinbefore described variable drive power transmission mechanism is shown as applied to the driving of a reel for taking up wire or cable which is advanced or delivered to the reel at a substantially constant linear speed. It will be evident that in order to maintain constant the tension on the wire, the angular speed of the take-up reel 10 must decrease as the diameter of the body of wire wound thereon increases.

Initially the position of the valve plunger 48 is such that at a given angular speed of the take-up reel 10 the proper wire or cable tension is secured. This merely means that the throttling action of the valve plunger 48 by means of the slots 58 thereof is such that the pressure against which the pump 28 works corresponds to the braking torque or resistance needed to provide the desired tension on the wire or cable. Assuming that all slippage of the pumps 28 and 34 and all undue fluid leakage throughout the system have been suitably compensated for, it being understood that in the normal condition of the fluid system it is filled with fluid, the operation of the power transmission mechanism is as follows: Upon power being applied to the shaft 12 to rotate it at constant speed, the spider 15, which is fixed thereto, revolves and through the bevel pinions 18 carried by the spider transmits motion to the bevel gears 20 and 21. The braking gear 20 through the gears 22 and 27 drives the pump 28, the gear 21 through the sleeve 23 drives the take-up reel 10 and the spider 15 through the gears 35 and 36 drives the pump 34. The pump 28 delivers fluid to the chamber 57 of the multiple control valve 31 which is throttled through the slots 58 of the plunger 48, to the annular chamber 59 and thence to the reservoir 32. With each successive layer of wire 14 wound upon the reel 10 the diameter of the body of wire thereon is increased and since the wire 10 is being delivered to the reel at a constant rate, the increase in diameter increases the rate at which the reel winds the wire and thereby increases the tension in the wire being wound. This causes the reel to offer increased resistance to rotation, which results in decreasing the speed of the shaft 11. The differential gear train 13 will balance this result by increasing the speed of the pump 28, and owing to its increased speed it will deliver a larger volume of pressure fluid to the chamber 57 to be throttled through the slots 58. This results in an immediate increase in the pressure of the fluid against which the pump 28 works due to the larger volume of fluid to be throttled through the slots 58. This increased pressure would give a driving torque more than that necessary to maintain the desired tension if the size of the fluid throttling openings, comprising the passages or slots 58, were not increased. However, at the same time, the valve plunger 48 is lifted, due to the increased pressure of the fluid in the chamber 57 acting against the lower surface thereof, the size of the passages through which the fluid is throttled is increased, thereby preventing the pressure from rising beyond the point necessary to give the desired tension. The braking torque exerted upon the gear 20 by the pump 28 consequently is increased the correct amount, thus increasing the driving torque exerted upon the reel 10 through the action of the differential gear train 13. In other words, as the reel 10 is built up the tendency for the tension on the wire to drop off as the result of the increased radius at which the wire is led onto the reel 10 is counteracted by the pressure of the fluid being increased to just the point corresponding to that required to maintain a constant tension on the wire. As the valve plunger 48 moves upwardly the fluid displaced from the chamber 56 above the piston 55, as the latter moves up, is forced through the slots 52 of the valve member 47 to the reservoir 32. At the same time pressure fluid from the pump 34 is moved into the chamber 76 below the piston 55.

In order to secure an increased starting torque to overcome the effects of inertia and static friction, the following action in the fluid system takes place. As the mechanism comes to a stop the pressure of the fluid in the chamber 57 is reduced and the spring associated with the valve plunger 48 forces the latter downwardly, substantially closing the throttling slots 58 from communication with the reservoir 32, during which movement the additional fluid required to fill the chamber 56 as the piston 55 moves downwardly is drawn thereinto from the reservoir through the pipe 65, check valve 66, chamber 63, and passage 64. The purpose of including the check valve 66 in the system is to prevent a partial vacuum being formed in the chamber 56 to oppose the downward movement of the plunger 48 which would occur if the additional fluid necessary to fill the chamber 56 were drawn through the slots 52 of the valve member 47.

During the downward movement of the piston 55 any fluid displaced from the chamber 76 is returned to the reservoir 32 through the passage 78, chamber 77, slots 53 of the valve plunger 49, chamber 70, outlet port 72, and pipe 73 connected to the reservoir. When starting the reeling apparatus from a condition of rest it is necessary, in order to provide an increased driving torque to the reel 10 at this time, to retard the upward movement of the main valve plunger 48 which will increase the pressure in the chamber 57 built up by the main pump 28, the throttling slots 58 at this time being substantially closed to the reservoir. Thus with this condition, it will be apparent, that in order for the main valve plunger 48 to move upwardly to relieve the pressure, the fluid in the chamber 56 above the piston 55 must be first forced through the throttling slots 52 of the valve member 47. This, of course, retards the upward movement of the main valve plunger 48, which creates a high back pressure on the pump 28 and provides an increased driving torque on the reel 10, for a period, until the throttling action of the slots 58 is such that the pressure against which the main pump 28 works provides the normal braking torque on the reel 10.

When the speed of the main drive shaft 12 is changed, which at times may be necessary or desirable even during the operation of reeling, the speed of delivery of the wire is correspondingly changed by means (not shown), and the speed of the pump 34 is proportionately changed since it is driven from the spider 15 of the differential gear train 13, the spider, as hereinbefore described, being driven direct from the shaft 12. The pump 34 is constantly by-passing pressure fluid through the throttling slots 53 of the adjustable valve plunger 49 to the reservoir 32 and also is maintaining pressure in the chamber 76 below the piston 55, such pressure of course being dependent upon the adjustment of the plunger 49 and the speed of the pump 34. With the plungers 48 and 49 adjusted so that at a given speed of the shaft 12 the proper tension is maintained on the wire 14 and thereafter the speed of the shaft 12, for example, is reduced by half, the following action takes place. The pressure in the chamber 76 will be correspondingly reduced and permit the spring associated with the plunger 48 to force the latter downwardly slightly, thus partially closing off the throttling action of the slots 58 of the plunger. This partial closing of the slots 58 tends to compensate for the reduced volume of fluid delivered by the pump 28 at the reduced speed; that is, it serves to prevent the pressure against which the pump 28 works from falling off, and thereby tends to maintain the same braking torque as at the original speed. The pump 34 and its circuit, therefore, acts as a speed torque compensator, and when this circuit is properly adjusted makes is unnecessary for the operator to change the setting of the plunger 48 when the speed of the machine as a whole is changed.

It will be apparent from the foregoing description that upon starting the reeling apparatus the fluid from the dash pot chamber 56 must be forced through the passages 52 of the adjustable valve member 47 in order to permit movement of the piston 55 and thereby the control valve plunger 48. This action serves to retard the opening of the passages 58 of the valve plunger 48 to the flow of fluid and thereby provides an increased starting torque. Also, that when the speed of the main drive shaft 12 is changed, the speed of the second pump 34 will accordingly be changed and the pressure in the chamber 76 is correspondingly raised or reduced, effecting a movement of the piston 55 and consequently a partial opening or closing of the passages 58 of the valve plunger 48 which serves to compensate substantially for the increased or reduced volume of fluid delivered by the main pump 28 at the changed speed. This action prevents the pressure against which the main pump 28 works from falling off and hence maintains the same braking torque in accordance with the original setting of the adjustable valve plungers 48 and 49 and thereby a constant tension on the wire 14.

It is to be understood that although a bevel gear type differential gearing is disclosed and described herein for interconnecting the driving and driven shafts 12 an 11, respectively, a spur type differential gearing can be used equally well.

Although the invention has been disclosed as applied to a particular type of apparatus, namely, a material reeling apparatus, wherein the reel is driven at a desired variable speed as the material is wound thereon, for maintaining a uniform tension on the material, and is shown in diagrammatic form, it should be understood that its use may have a broader application, and furthermore that modifications can be made without departing from the spirit and scope of the appended claims.

What is claimed is:

1. In a power transmission mechanism, a driving shaft, a driven work performing member, a differential gear train interconnecting said shaft and member, a pressure fluid system including a fluid pump driven from said train at a speed variable in accordance with changes in the operating conditions of the driven member, and means connected to the outlet side of said pump for continuously throttling the flow therefrom and responsive to the pressure of the fluid delivered by the pump for varying the pressure against which the pump works and thereby the power transmitted from said driving shaft through the train to the driven member for maintaining a desired operating condition of the driven member.

2. In a power transmission mechanism, a driving shaft, a driven work performing member, a differential gear train interconnecting said shaft and member, a pressure fluid system including a positive delivery fluid pump driven from said train at a speed variable in accordance with changes in the operating conditions of the driven member, and adjustable means connected to the outlet side of said pump for continuously throttling the flow therefrom and responsive to the pressure of the fluid delivered by the pump for controlling the pressure against which the pump works and thereby predeterminedly varying the power transmitted from said driving shaft through the train to the driven member for maintaining a desired operating condition of the driven member.

3. In a power transmitting mechanism, a driving shaft, a driven work performing member, a differential gear train interconnecting said shaft and member, a pressure fluid system including a fluid pump driven from said train at a speed variable in accordance with changes in the operating conditions of the driven member, and a valve connected to the outlet side of said pump for throttling the flow therefrom, said valve including a plunger responsive to the pressure of the fluid delivered by the pump for varying the flow through the valve and thereby controlling the pressure against which the pump works and consequently the power transmitted from said driving shaft through the train to the driven member for maintaining a desired operating condition of the driven member.

4. In a power transmitting mechanism, a driving shaft, a driven work performing member, a differential gear train interconnecting said shaft and member, a pressure fluid system including a fluid pump driven from said train at a speed variable in accordance with changes in the operating conditions of the driven member, and a valve comprising a casing having inlet and outlet ports, the inlet port connected to the outlet side of said pump, a plunger movable within the casing having fluid throttling passages, the plunger responsive to the pressure of the fluid delivered by the pump for controlling the pressure against which the pump works and thereby the power transmitted from the driving shaft through the train to the driven member for maintaining a desired operating condition of the driven member, and adjustable means acting against the plunger for initially providing a predetermined fluid throttling action through the valve to effect a desired operating condition of the driven member.

5. In a power transmission mechanism, driving and driven shafts, a differential gear train interconnecting said shafts, a pressure fluid system including a fluid pump driven from said train at a speed variable in accordance with changes in the operating conditions of the driven shaft, means connected to the outlet side of said pump for throttling the flow therefrom and responsive to the pressure of the fluid delivered by the pump for controlling the pressure against which the pump works and thereby effecting a predetermined operating condition of the driven shaft, and means operatively associated with said pressure responsive means for retarding the throttling action of the pressure responsive means upon power being applied to start said driven shaft from a condition of rest and thereby effecting an increased starting power through the train to the driven shaft.

6. In a power transmission mechanism, driving and driven shafts, a differential gear train interconnecting said shafts, a pressure fluid system including a plurality of fluid pumps driven from said train, one of said pumps being driven at a speed variable in accordance with changes in the operating conditions of the driven shaft, the other of said pumps being driven at a speed proportional to the speed of the driving shaft, means connected to the outlet side of said first pump responsive to the pressure of the fluid delivered by the pump for controlling the pressure against which the pump works and thereby effecting a predetermined operating condition of the driven shaft for a certain speed of the driving shaft, means connected to the outlet side of said second pump for controlling the pressure of the fluid delivered thereby, and means for directing such pressure against said pressure responsive means, such pressure varying with the speed of the driving shaft and thereby compensating for increased or reduced volume of fluid delivered by the first pump in response to a change in speed of the driving shaft.

7. In a power transmission mechanism, a driving shaft, a driven shaft, a fluid pump, a differential gearing driven by said driving shaft and differentially driving said driven shaft and said pump, and an adjustable yielding valve at the outlet of said pump for continuously throttling the flow of fluid therefrom, whereby an increased torque is applied to said driven shaft when the speed thereof decreases.

EDWARD J. CRANE.